(12) United States Patent
Suzuki

(10) Patent No.: US 8,464,977 B2
(45) Date of Patent: Jun. 18, 2013

(54) POSITIVE-PRESSURE FLYING AIRCRAFT

(75) Inventor: Masahiko Suzuki, Hamamatsu (JP)

(73) Assignee: Kabushiki Kaisha Bellsion (JP)

(*) Notice: Subject to any disclaimer, the term of this patent is extended or adjusted under 35 U.S.C. 154(b) by 608 days.

(21) Appl. No.: 12/677,917

(22) PCT Filed: Aug. 12, 2008

(86) PCT No.: PCT/JP2008/064471
§ 371 (c)(1),
(2), (4) Date: Mar. 12, 2010

(87) PCT Pub. No.: WO2009/034805
PCT Pub. Date: Mar. 19, 2009

(65) Prior Publication Data
US 2010/0213308 A1    Aug. 26, 2010

(30) Foreign Application Priority Data
Sep. 14, 2007  (JP) .................... 2007-239298

(51) Int. Cl.
*B64C 39/00*  (2006.01)

(52) U.S. Cl.
USPC .............................................. 244/13; 244/87

(58) Field of Classification Search
USPC .............. 244/4 R, 5, 13, 15, 36, 87
See application file for complete search history.

(56) References Cited

U.S. PATENT DOCUMENTS

| | | | | |
|---|---|---|---|---|
| 1,182,317 A | * | 5/1916 | Rogala | 244/87 |
| 1,284,590 A | * | 11/1918 | Caproni | 244/13 |
| 1,710,028 A | * | 4/1929 | Morse | 244/45 R |
| 2,140,783 A | | 12/1938 | Bellanca | |
| 2,435,168 A | | 1/1948 | Suggs | |
| 3,023,981 A | * | 3/1962 | Reiniger | 244/12.4 |
| 3,871,602 A | * | 3/1975 | Kissinger | 244/13 |
| 3,884,432 A | * | 5/1975 | Blanchard, Jr. et al. | 244/15 |
| 4,746,081 A | * | 5/1988 | Mazzoni | 244/89 |
| 6,592,073 B1 | | 7/2003 | Meekins | |
| 2002/0003190 A1 | | 1/2002 | Sankrithi et al. | |

FOREIGN PATENT DOCUMENTS

| | | |
|---|---|---|
| JP | 144773/1987 | 3/1989 |
| JP | 2004-106784 | 4/2004 |

OTHER PUBLICATIONS

International Search Report dated Nov. 18, 2008, issued in corresponding international application No. PCT/JP2008/064471.

* cited by examiner

*Primary Examiner* — Rob Swiatek
(74) *Attorney, Agent, or Firm* — Ostrolenk Faber LLP

(57) ABSTRACT

A positive-pressure floating type airplane comprising an airfoil portion, left-right fuselages, a central fuselage, an elevator and a rudder disposed at the back of the airfoil portion, a thruster disposed at the back of the central fuselage, and a horizontal stabilizer disposed at the rear ends of the left-right fuselages. The individual front ends of the airfoil portion, the left-right fuselages and the central fuselage are formed into arcuate shapes in longitudinal sections. On the lower side of the airfoil portion, a recessed air capture is formed from the front end to the rear end. As a result, the positive-pressure floating type airplane is floated by the reaction from the air at the time when the air to pass the air capture through the airfoil portion is pushed by the thrust of the thruster, and is propelled forward by the component of that thrust.

8 Claims, 2 Drawing Sheets

POSITIVE-PRESSURE FLYING AIRCRAFT

CROSS REFERENCE TO RELATED APPLICATIONS

The present application is a 35 U.S.C. §371 National Phase conversion of PCT/JP2008/064471, filed Aug. 12, 2008, which claims benefit of Japanese Application No. 2007-239298, filed Sep. 14, 2007, the disclosure of which is incorporated herein by reference. The PCT International Application was published in the Japanese language.

TECHNICAL FIELD

The present invention relates to a positive-pressure flying aircraft, and particularly to a positive-pressure flying aircraft that does not comprise a cantilever wing, the aircraft flying by relevant stream or positive pressure flowing along the lower surface of the aircraft.

BACKGROUND OF THE INVENTION

An aircraft provides lift by negative pressure along the upper surface of a wing because of difference in velocity of air stream flowing on the upper and lower surfaces.

JP2004-106784A discloses a kite-type aircraft that flies by air stream or positive pressure.

In the kite-type aircraft, the angle of attack gets greater to about 60 degrees in low-speed flight or landing, which is similar to a kite. In the aircraft, thrust and lift are generated by a jet engine for discharging a gas obliquely downward like an ordinary airplane. Lift is not generated by air stream.

In low-speed flight and landing, the angle of attack of the whole aircraft has to be made very large and it is very difficult to run on the ground with the very large angle of attack.

SUMMARY OF THE INVENTION

It is an object of the invention to provide a positive-pressure flying aircraft that does not comprise a cantilever wing having a free end, the aircraft flying by relative air stream, assuring stable flight in landing/takeoff or at low speed.

The inventor found that aircraft weight is supported by a component force of reaction force obtained by air stream generated on the upper and lower surface of the aircraft by going forward by a thrusting device, the aircraft being raised by a component force of thrust by the thrusting device and flying while its posture is kept at optimum.

BEST MODE FOR CARRYING OUT THE INVENTION

An embodiment of the present invention will be described with respect to the drawings.

Figure 1:
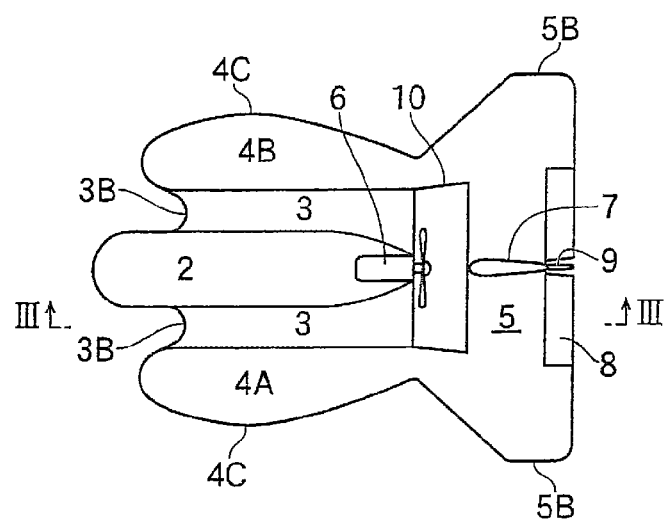
FIG. 1 is a top plan view of an embodiment of an aircraft according to the present invention.
Figure 2:
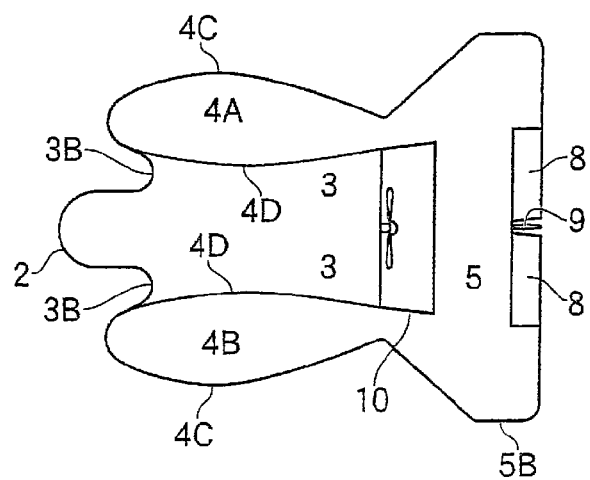
FIG. 2 is a bottom plan view thereof.

In FIGS. 1 and 2, differently from a conventional aircraft, a positive-pressure flying aircraft in this embodiment is characterized in that the aircraft that is different from a conventional aircraft has not a long wing extending transversely.

The aircraft comprises a main body 2 in the middle; a wing 3 projecting transversely from the lower part of the main body 2; a right body 4A and a left body 4B fixed to each side of the wing 3; a horizontal stabilizer 5 at the rear ends of the right and left bodies 4A, 4B; and a propeller 6 at the upper and rear end of the main body 2. On the horizontal stabilizer 5, a vertical fin 7 and an elevator 8 are provided, while a rudder 9 is provided on the vertical fin 7.

Between the front edge of the horizontal stabilizer 5 and the rear edge of the wing 3, there is formed a gap 10 in which the propeller 6 is disposed.

The vertical fin 7 is disposed in the middle of the horizontal stabilizer 5, and the rudder 9 is mounted at the rear part of the vertical fin 7. The elevator 8 is mounted to the rear end of the horizontal stabilizer 5.

In FIG. 1, the right body 4A and the left body 4B have a hemispherical front end and the inner side surface is almost linear. Each of the right and left bodies 4A, 4B have an outer side 4C.

In FIG. 2, an inner side 4D is formed on the right body 4A and the left body 4B at the bottom of the aircraft. The bottom surface of the wing 3 is continuous with the bottom surface of the main body 2.

Figure 4:
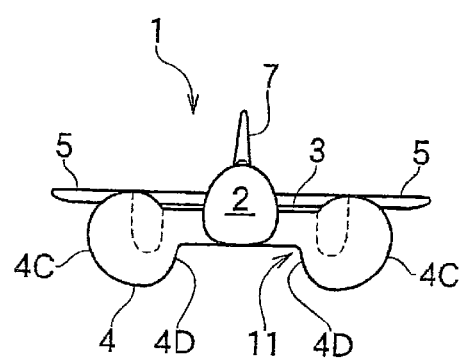
FIG. 4 is a front elevational view thereof.

In FIG. 4, the front faces of the right and left bodies 4A, 4B are elliptical and the rear ends thereof are curved upward.

The front end of the wing 3 is behind the front ends of the right and left bodies 4A, 4B. A concave portion 3B is formed on the front edge of the wing 3.

Figure 3:
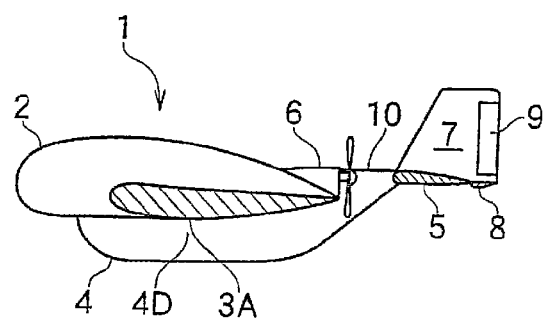
FIG. 3 is a cross sectional view taken along the line III-III in FIG. 1.

In FIG. 3, the wing 3 has a hemispherical front end and the upper surface of the wing 3 is flat. A positive camber 3A is formed on the lower surface of the wing 3. The wing 3 gradually gets thinner rearward from the maximum thickness portion of the wing 3.

The front end of the wing 3 is formed as a concave portion 3B having a horizontal circular cross section. Owing to such shape of the concave portion 3B, an air stream is unlikely to leave the wing 3.

The maximum thickness portion of the wing 3 is provided at a position of $2/10$ to $3/10$ of the chord length from the leading edge of the wing 3. The thickness of the maximum thickness portion is $3/10$ to $4/10$, preferably $35/100$ of the chord length.

If the thickness of the maximum thickness portion is less than $3/10$ of the chord length, the thickness of the wing 3 would not be enough and adequate lift would not be generated. If it is over $4/10$, the air resistance would be too large. If the leading edge of the wing 3 is thicker than the maximum thickness portion, turbulence would occur.

The wing 3 is thinner than the right body 4A and the left body 4B. The lower halves of the right body 4A and the left body 4b project from the lower surface of the wing 3.

The wing 3, the right body 4A and the left body 4B make a gate-like frame as a whole in a vertical cross section. The bottom surface of the wing 3, the right body 4A and the left body 4B define an air path 11 extending from the leading edge to the trailing edge of the wing 3.

In FIG. 2, a distance between the inner side 4D of the right body 4A and the inner side 4D of the left body 4B is shorter than the distances between the leading edges and between the trailing edges of the right body 4A and the left body 4B.

During flight of the aircraft 1, an air stream that passes in the air path 11 is accelerated by the Coanda Effect between the inner sides 4D and 4D and passes rearward.

The main body 2 tapers rearward.

The elevator 8 is hinged at the rear end of the horizontal stabilizer 5. The lower surface of the elevator 8 is convex, and the upper surface is flat. The side edges 5B of the horizontal stabilizer 5 project outward from the right and left bodies 4, and the rear end of the wing 3 is close to the front end of the side edges 5B.

The horizontal stabilizer 5 has a vertical cross section inverse to that of the wing 3. In this embodiment, the wing 3 has an upper surface which is flat and a lower surface with a positive camber 3A, while the horizontal stabilizer 5 has an upper surface with a positive camber and a lower surface which is flat. The upper surface of the wing 3 is not limited to the shape in FIG. 3. If a positive camber is formed on the upper surface of the wing 3, the upper surface of the horizontal stabilizer 5 will be flat.

The horizontal stabilizer 5 is higher than the rear end of the wing 3 in FIG. 3, enabling the aircraft to fly stably.

Instead of the propeller 6, a jet engine or a rocket engine may be employed to generate thrust. If the aircraft 1 is a small plane, an unmanned plane or a model plane, a propeller may be combined with a motor driven by an electrical source such as a battery.

In the aircraft 1, if necessary, a wheel (not shown) for running on the ground may be provided. The wheel is disposed on the front of the lower surfaces of the right body 4A and the left body 4B and in the middle of the lower surface of the horizontal stabilizer 5. If the aircraft 1 is used as a flying boat, the right body 4A and the left body 4B may be used as a float.

When the aircraft 1 in this embodiment is accelerated by the propeller 6 from a rest on the ground or water, relevant stream flows into the air path 11 from the front end of the wing 3.

An air stream passes rearward through the air path 11 along the right body 4A and the left body 4B at high speed without flowing out of the aircraft 1 transversely. The high-speed air stream pushes lower air downward. Owing to a reaction force to the pushed air, the wing 3 is pushed up, so that the aircraft 1 obtains lift.

The flight of the aircraft 1 will be described compared with the flight of a Japanese kite.

A tilted front face of the Japanese kite is pushed and tension is applied to a kite string for supporting the Japanese kite. With or without wind, the kite string is pulled down and an air stream hits the front face. The kite floats up by a reaction force and will rise to a position having a balancing angle of attack. The rising force is a component force of the reaction force so far as the kite string is not extended. When the kite string is extended, the rising force will be a resultant force of the above component force and a component force perpendicular to the front face of the kite.

In this embodiment, instead of tension of the kite string, when the aircraft with the wing is accelerated by the propeller, the above two forces will be obtained as reaction forces.

While air is pushed by the propeller over the wing 3, the elevator is slightly tilted downward. A floating force applied to the wing is restricted, so that the aircraft flies slightly above the ground.

With increase in thrust of the propeller 6, the elevator 8 is tilted upward, and the front of the aircraft 1 is raised. Furthermore, in proportion with increase in thrust of the propeller, the aircraft 1 gets a large reaction force and is accelerated to rise.

The angle of attack of the wing 3 increases remarkably. However, the front ends of the wing 3, the right body 4A and the left body 4B are hemispherical, so that air does not leave the leading edge of the wing 3. Thus, the aircraft doe not go into a stall or does not crash.

Air passes through the air path 11 rearward and is restricted by the camber 3A at the front part of the wing 3 and a sectional area of the air path 11 increases rearward. By the Coanda Effect, a high-viscosity slow stream is generated along the bottom surface, the inner side surface of the right body 4A and the inner side surface of the left body 4B.

A high-speed air stream is produced, and a large thrust can be applied to the wing by the high-speed air stream.

In low-speed flight where output of the propeller 6 is small, a force of the aircraft 1 for pushing lower air downward is weak. The angle of attack of the whole aircraft 1 increases and a forward component force of thrust by the propeller 6 is small.

With increase in power of the propeller 6, a force for limiting air by the wing 3 gets stronger, and the angle of attack gets smaller. The component force of thrust by the propeller 6 gets greater in a forward direction, enabling the aircraft to fly at high speed.

Depending on thrust of the propeller 6, the angle of attack of the aircraft 1 can be changed, assuring stable flight. If wind speed is equal to the forward component force of the aircraft 1, the aircraft 1 will hover.

The vertical cross section of the horizontal stabilizer 5 is in inverse relationship with the vertical cross section of the wing 3. Lift is generated on the upper surface of the horizontal stabilizer 5 by negative pressure, and the lift opposes a moment for raising the whole wing 3 forward, making its flight posture more stable.

In this embodiment, the air path 11 is single, but a plurality of air paths may be formed side by side. The ratio of the air path 11 to the wing 3 may be preferably at least ½. If it is less than ½, floating force of the aircraft would not be enough, so that it would be necessary to strengthen the power of the propeller 6. The depth of the air path 11 may be determined such that the aircraft does not slide sideward.

INDUSTRIAL APPLICABILITY OF THE INVENTION

The aircraft can be widely used to fly stably even at low speed.

The invention claimed is:

1. A positive-pressure flying aircraft comprising:
a main body having a front end;
a right body disposed at one side of the main body and having a front end;
a left body disposed at the other side of the main body and having a front end, the front ends of the right and left bodies being behind the front end of the main body;
a wing supported by the main body, the right body and the left body and having a front end that is behind the front ends of the right and left bodies, an air path being defined longitudinally of the aircraft by a bottom surface of the wing and inner side surfaces of the right and left bodies;
a horizontal stabilizer;
a thrusting device in a gap;
a vertical fin in the middle of the horizontal stabilizer;
a rudder at the rear end of the vertical fin; and
an elevator at the rear end of the horizontal stabilizer,
wherein the wing has an upper surface which is flat and a lower surface with a positive camber, and the horizontal stabilizer has an upper surface with a positive camber and a lower surface which is flat, the wing gradually getting thinner rearward from a maximum thickness portion, the gap being formed between the wing and the horizontal stabilizer.

2. The aircraft of claim 1, wherein the maximum thickness portion of the wing has a thickness ranging from $3/10$ to $4/10$ of a chord length of the wing, the maximum thickness portion being formed at a position of 2/10 to 3/10 of the chord length from a leading edge of the wing.

3. The aircraft of claim 1, wherein the wing has a concave portion at the front end.

4. The aircraft of claim 1, wherein each of the right body and the left body has a downward projection at the same position as that of the positive camber on the lower surface of the wing.

5. The aircraft of claim 1, wherein the front end of the main body is formed as a hemisphere.

6. The aircraft of claim 1, wherein the elevator is hinged to the rear end of the horizontal stabilizer, the elevator having an upper surface which is flat and a lower surface with a positive camber.

7. The aircraft of claim 1, wherein the thrusting device comprises a propeller.

8. A positive-pressure flying aircraft comprising:
a main body having a front end;
a right body disposed at one side of the main body and having a front end;
a left body disposed at the other side of the main body and having a front end, the front ends of the right and left bodies being behind the front end of the main body;
a wing supported by the main body, the right body and the left body and having a front end that is behind the front ends of the right and left bodies, an air path being defined longitudinally of the aircraft by a bottom surface of the wing and inner side surfaces of the right and left bodies;
a horizontal stabilizer;
a thrusting device in a gap;
a vertical fin in the middle of the horizontal stabilizer;
a rudder at the rear end of the vertical fin; and
an elevator at the rear end of the horizontal stabilizer,
wherein one of the upper surface and the lower surface of the wing is flat, the other one of the upper surface and the lower surface of the wing has a positive camber, one of the upper surface and the lower surface of the horizontal stabilizer is flat, and the other one of the upper surface and the lower surface of the horizontal stabilizer has a positive camber, one of the upper surface of the wing and the upper surface of the horizontal stabilizer being flat, the other one of the upper surface of the wing and the upper surface of the horizontal stabilizer having a positive camber, the gap being formed between the wing and the horizontal stabilizer, and
wherein the front end of each of the right body and the left body is formed as a hemisphere.

\* \* \* \* \*